United States Patent [19]

Long

[11] 3,816,689
[45] June 11, 1974

[54] APPARATUS FOR PRODUCING SUPER HEATED FLUIDS

[76] Inventor: Raymond E. Long, 26323 Ridge Rd., Damascus, Md. 20750

[22] Filed: Oct. 19, 1973

[21] Appl. No.: 408,224

[52] U.S. Cl. .............................. 219/10.55, 165/136
[51] Int. Cl. .............................................. H05b 9/06
[58] Field of Search.................. 219/10.55; 165/136

[56] References Cited
UNITED STATES PATENTS
3,539,751  11/1970  Levinson......................... 219/10.55
3,577,322  5/1971  Nesbitt et al. .................... 219/10.55

*Primary Examiner*—J. V. Truhue
*Assistant Examiner*—Hugh D. Jaeger
*Attorney, Agent, or Firm*—Pollock, Philpitt & Vande Sande

[57] ABSTRACT

The disclosure relates to an apparatus for producing vapors and super heated fluids by converting electromagnetic energy into thermal energy through irradiation of an intermediate matrix. A coil of tubing having a high thermal conductivity is embedded within this absorbtive matrix and the matrix is heated by microwave energy. The fluid to be vaporized or super heated passes through the coil and is vaporized by thermal energy. It is also possible to select matrix and coil materials that will vaporize the fluid through both thermal and microwave irradiation. The invention is particularly applicable to a vapor powered vehicle that produces no environmental pollution.

9 Claims, 3 Drawing Figures

PATENTED JUN 11 1974 3,816,689

APPARATUS FOR PRODUCING SUPER HEATED FLUIDS

BACKGROUND OF THE INVENTION

Microwave energy has been widely used in the prior art for heating solids and fluids. The prior art illustrates a microwave source of rapidly heating a fluid to be pasturized, and then recooling it again. This method is intended to heat fluids to temperatures above their boiling points while they are under pressure to destroy bacteria and the like. It envisions that the fluid would be subjected to the microwave heating for an exposure time in the order of 0.1 to 0.01 of a second.

The prior art also teaches the heating of ceramic articles with a ferrite particle bed wherein the ferrite material "arcs" and becomes a red hot "coat." These ferrous "coals" are quickly heated through the "arcing" as the irradiation begins, and then give off their heat slowly to aid in curing ceramic articles which are placed within the particle bed.

The prior art also illustrates an instantaneous water heating system wherein the water heater heats the fluid on demand, but does not maintain or store a large body of heated water for domestic use.

The prior art references do not disclose an apparatus for providing super heated fluids for heating fluids at pressures and temperatures far in excess of the normal temperature-pressure vaporization curves. These references do not disclose as their end or terminal product a super heated fluid in the vapor state. The super heated nature of the vapor has proved very advantageous in conveying the maximum amount of energy from the energy source to a vapor turbine or steam engine. The super heated nature of the vapor, and the amount of energy required to generate the super heated vapor would destroy the conventional prior art apparatus if an attempt were made to generate the super heated vapor with it.

The prior art does not disclose a matrix formed of a semiconductor composition. Silicon carbide is a varistor, and a very stable compound that will not break down and combine with oxygen at the temperatures needed to produce super heated vapors.

SUMMARY OF THE INVENTION

It is therefore an object of this invention to provide an apparatus which will utilize microwave energy to generate super heated vapor at high pressure levels. This apparatus would find particular application in pollution free motor vehicles where the generation of ultra high energy vapor or steam is desirable.

It is another object of this invention to provide an apparatus that will withstand the high pressures and temperatures at which it is intended to operate. The apparatus envisions the use of a thermally conductive tube which may be prestressed in its coil form to normalize those stress loadings when the device is operating at its intended pressure and temperatures levels. This coil may be completely embedded within a matrix which is directly exposed to the microwave energy. The matrix is completely enclosed within a shielding cabinet. The microwave generating source is removed from the cabinet and connected thereto by means of a wave guide to prevent the destruction of the magnetron which would normally occur if the magnetron were exposed to the energy levels that will be present in the matrix when the device is operating at its intended pressure and temperature levels.

Although the device is intended to operate at very high pressure and temperature levels, it is quite apparent that the output of the device is variable between 1 and 1,000 psig, and from 0 to 300° or 400°F of super heat, beyond the normal temperature-pressure variation curve.

DESCRIPTION OF THE PREFERRED EMBODIMENTS

Figure 1:
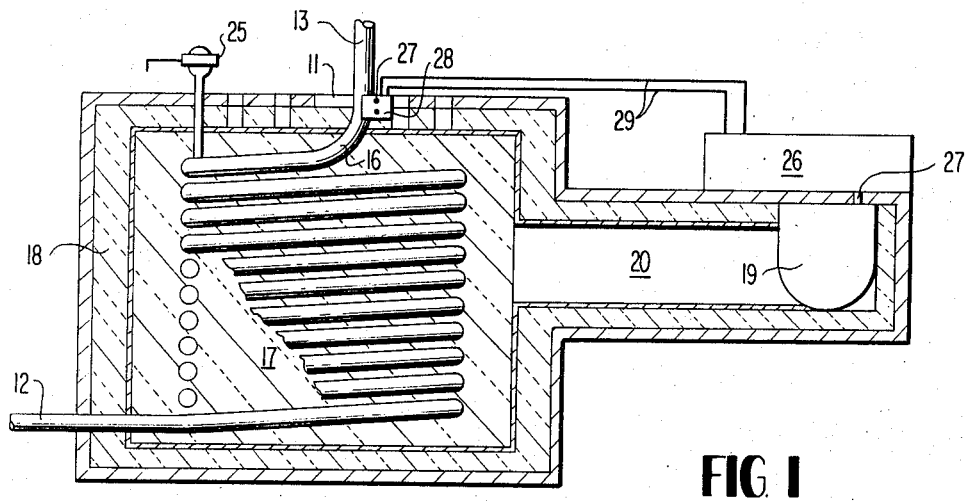
FIG. 1 id a diagrammatic cross section view of the apparatus for producing super heated vapor according to my invention.

FIG. 1 discloses the apparatus for generating super heated vapor. While the description of this apparatus and its operating temperatures and pressures will be for the generation of water vapor, it is to be understood that any suitable fluid may be used. Only the operating parameters would be changed.

The generating apparatus is contained within casing 11 and defines a water inlet 12 and a vapor outlet 13. The inlet and outlet are connected to a length of thermally conductive tubing 16 which is helically coiled and completely enclosed within casing 11. The coil 16 is equipped near its discharge end with a temperature and pressure relief valve 25 to provide a safety valve in the event of overheating.

Surrounding the coil is a matrix 17 specifically formulated to absorb the microwave energy, and cause a thermal temperature rise within the matrix without arcing. An insulating and vibration absorbing layer 18 surrounds the matrix 17 and provides not only insulation for the extremely high temperatures at which the device is intended to operate, but also provides a shock absorbing or movement absorbing means for dampening vibrations caused by sudden movements of the generator, if the generator is used in a mobile application.

The matrix material 17 may be formed from a variety of materials. Although the word "matrix" has been used through-out the specification, it should be understood the invention is not limited to a material having a matrix formed therein. The material may be crystaline or amorphous or a combination of both. It is important that the material have a resistive property for it is felt that the resistive nature of the material is instrumental in the conversion of micro-wave energy to heat. The "matrix" may be a single compound, or a ceramic matrix with resistive particles embedded therein. However, it should be pointed out that if the resistive particles become too large, they may oxdize, explode, or vaporize when subjected to large amounts of microwave energy. It is also important that the material be stable at high temperatures.

In the preferred embodiment of the invention, silicon carbide was used as the matrix material since it formed a resistive semiconductor that was stable at high temperatures and had a low coefficient of expansion. The application of microwave energy to a compound of this nature will result in a rapid heat rise within the matrix, and a transfer of this heat to the thermally conductive coil. Although SiC has been selected as the preferred matrix, it would also be possible to select another matrix material, so long as the matrix has a sufficiently high melting temperature to prevent melting or oxidation of the matrix at the intended or designed temperatures and pressures, and so long as the matrix had a coefficient of expansion closely matched to that of the thermal conducting tubing.

In the preferred embodiment of the invention, the silicon carbide SiC used was compounded of approximately 70 percent silicon and 30 percent carbon.

The silicon carbide matrix material is arranged around an alloy steel tubing comprising 42 percent nickel and 58 percent iron, and having a trade name "platinite" steel. Since a relatively wide range of temperatures and pressures are encountered by both the tubing and the matrix material, it is desired to closely match the coefficients of expansion of the tubing and matrix to insure the minimum possible stress loading of one by the other.

Still another embodiment of the present invention would utilize boro-silicate glass matrix having a conductor of coke based graphitized carbon added thereto. The matrix would be approximately 75 percent glass and 25 percent carbon. In this embodiment, it would also be possible to use boro-silicate glass tubing as was discussed in my copending application entitled "Apparatus for Producing Super Heated Fluids," U.S. Ser. No. 311,189 filed Dec. 1, 1972. In this way it is possible to provide a matrix material which is partially transparent to microwave energy and a tubing material which is also transparent to microwave energy to provide simultaneous heating of the fluid by both direct dielectric heating and conductive heating through heat absorption by the surrounding matrix.

Figure 3:
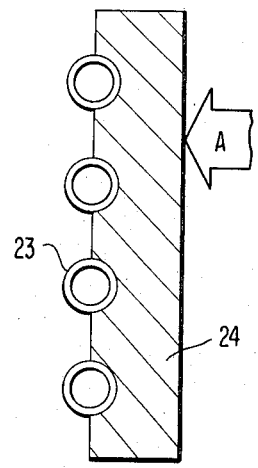
FIG. 3 s a cross-sectioned view of an alternate embodiment of the invention.

FIG. 3 discloses an alternative embodiment of the present invention wherein the tubing coil 23 is illustrated in a cross-sectioned form in immediate abutment with a matrix member 24. The source of microwave irradiation is generally indicated by the arrow A, and impinges directly on the matrix member 24. Matrix member 24 is so sized as to totally absorb the entire amount of microwave radiation before it reaches the coiled tubing 23.

Referring to FIG. 1, coil 16 is prestressed when it is wound so as to provide a structure that will unstress when operating at its intended temperature and pressure levels. Thus if the device were intended to operate at 750 psig and 700°F then the coil would be stressed during its winding so that at those temperatures the stress loads induced in the coil would be completely normal.

The microwave energy used to heat the fluid passing from the water inlet 12 to the vapor outlet 13 is generated by a magnetron tube 19 which is suitably connected to the resonant chamber by means of a wave guide 20. It is to be understood that any number of microwave generators may be employed. In the preferred example, a magnetron tube 19 operates in the range of 600 MHz. It would be possible to employ either a magnetron or a klystron tube operating at 400 MHz to 2,400 MHz. The length of the wave guide 20, its interior dimensions and the dimensions of the matrix 17 are determined by the frequency and power of magnetron 19. It has been found necessary to isolate the source of microwave energy from the matrix since if it were placed within the matrix it would be very rapidly destroyed by the amount of microwave energy present therein. This wave guide also tends to direct the primary waves of energy to the uppermost end of the matrix and the upper end of the coil of tubing 16. This ensures that the fluid passing through coil 16 is vaporized when it leaves outlet 13. It is desirable to match the load to the microwave source as closely as possible to maximize the heating efficiency of the invention. The microwave source 19 is controlled by a power source 26 which is connected to the generator as illustrated at 27. The power source receives feedback signals from the transducers 27 and 28 which are mounted at the output end of the generator. Transducers 27 and 28 are connected to power source by conductors 29 and provide an indication of both the output temperature and output pressure. This information is used in regulating the amount of microwave energy generated by source 19.

As was pointed out previously, the device is capable of operating at any pressure and temperature level from 0 to 300° or 400°F of super heat and from 1 to 1,000 psig. Since the net external work that may be performed in a vapor engine or steam engine is proportional to the amount of heat supplied to the substance, and therefore the amount of increase in total heat, it is dsirable to operate the steam generator in the super heat region. If heat is added at constant pressure, as in the subject application, no net external work is done and all heat is used to increase the enthalpy of the vapor. Thus the change in enthalpy represents the heat absorbed at constant pressure. Once the steam is transmitted to the vapor engine, be it turbine or piston type, the change is enthalpy produced by the super heat can be converted to useful work by adiabitic expansion within the device.

The device is then intended to operate between the pressure and temperature levels that provide saturated steam, and the pressure and temperature levels which define the critical point for water vapor. The critical point is defined here as pressures higher than the critical pressure, and temperatures higher than the critical temperature, wherein the fluid or vapor exists as a single phase only, and the vapor pressure curve is terminated in the critical point.

Figure 2:
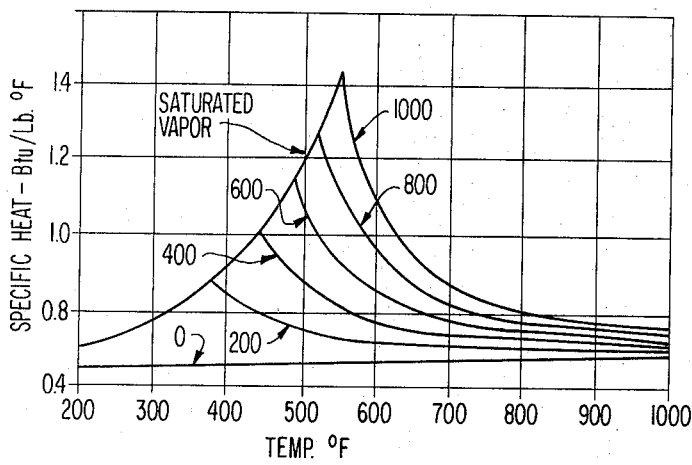
FIG. 2 is a chart illustrating the specific heat in BTU's per pound per degree Fahrenheit for water vapor at five levels of constant pressure.

As can be noted in FIG. 2, the specific heat in BTU's per pound per degree Fahrenheit necessary to excite the vapor for each additional degree of super heat drops after the vapor becomes saturated and moves into its super heated state. FIG. 2 illustrates water vapor at 200, 400, 600, 800, and 1,000 pounds per square inch. Each of the curves represents the specific heat necessary to raise the vapor by the temperature indicated on the abscissa of the graph.

We claim:

1. Means for producing super heat vapor including:

a. a housing defining microwave absorption chamber, said housing having shielding means to prevent the escape of microwave energy,
 b. means for generating microwave energy mounted outside said chamber,
 c. a coil of thermally conductive tubing mounted within said chamber, said tubing having a fluid inlet and vapor outlet which extend through said housing, d. matrix means having a resistive property mounted within said housing to surround said coil, said matrix means and contacting said coil absorbing the microwave energy generated by said means for generating microwave energy, e. wave guide means for connecting said microwave generating means to said matrix means to direct the microwave energy into said matrix.

2. Means for producing super heat vapor as claimed in claim 1 wherein said matrix means comprises silicon carbide.

3. Means for producing super heat vapor as claimed in claim 2 wherein said tubing is formed of a steel alloy comprising 42 percent nickel and 58 percent iron.

4. Means for producing super heat vapor as claimed in claim 1 wherein said matrix means comprises a semiconductive material.

5. Means for producing super heat vapor as claimed in claim 1 wherein said means for generating microwave energy operates at approximately 600 MHz.

6. Means for producing super heat vapor as claimed in claim 1 wherein said matrix means includes at least 25 percent carbon.

7. Means for producing super heat vapor as claimed in claim 1 wherein said wave guide is sized to match the frequency of said microwave generating means.

8. Means for producing super heat vapor as claimed in claim 7 wherein said wave guide means directs the microwave energy to the uppermost coils of said thermally conductive tubing.

9. Means for producing super heat vapor as claimed in claim 1 which further includes control means for regulating the output of said means for generating microwave energy.

* * * * *